Patented June 1, 1948

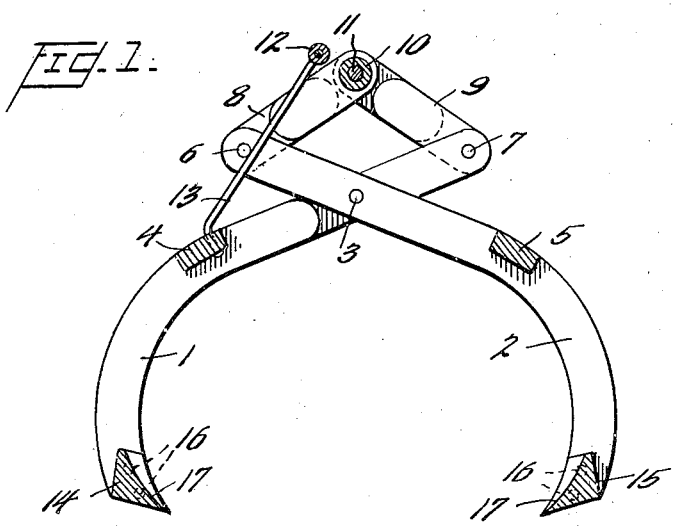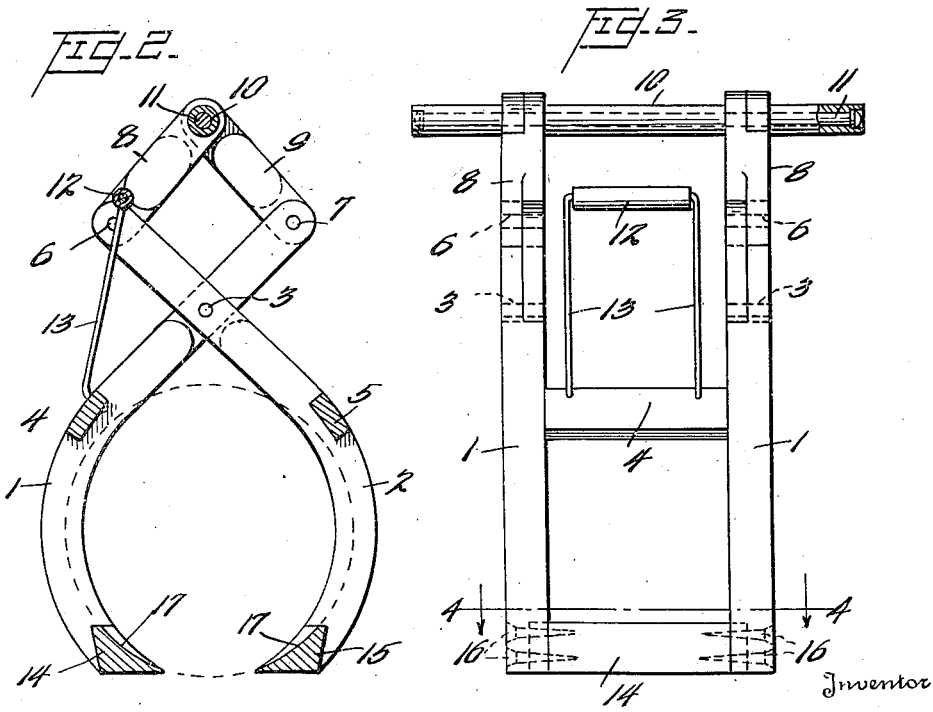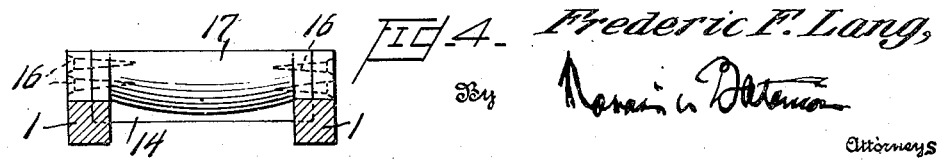

2,442,698

UNITED STATES PATENT OFFICE 2,442,698

TONGS

Frédéric F. Lang, Leesburg, Fla.

Application February 10, 1945, Serial No. 577,175

3 Claims. (Cl. 294—117)

The present invention relates to tongs adapted to be used in carrying articles or objects, and more especially for carrying articles or objects of ovoidal shape, such as watermelons which are difficult to carry in the hands.

The primary object of the invention is to provide tongs of this class having means for holding them open and thereby facilitating the placing of the tongs over the object to be carried, and for releasing such holding means, and means for automatically closing the tongs on the object when a lifting force is applied to the tongs.

Another object is to provide tongs having toggle means for closing the tongs on the object, such means acting to close the tongs on the object according to the weight of the object and consequently the amount of force applied in lifting it.

A further object is to provide tongs composed of duplex members connected by jaws of ovoidal concave curvature to conform substantially with the shape of ovoidal objects whereby the tongs obtain an effective hold upon and beneath the objects and avoids accidental dropping of the objects from the tongs while being carried, and the pressure of the tongs on the object incident to the gripping thereof is so distributed as to avoid excessive pressure at localized points which might bruise or injure objects such as watermelons.

To these and other ends, the invention consists in certain improvements and combinations and arrangements of parts, all as will be hereinafter described, the features of novelty being pointed out particularly in the claims at the end of this specification.

In the accompanying drawing:

Figure 1 is a vertical section taken centrally through tongs embodying the present invention, the tongs being shown in open or article receiving condition.

Figure 2 is a view similar to Figure 1 but showing the tongs closed.

Figure 3 is a side elevation of the tongs shown in Figures 1 and 2.

Figure 4 is a detail section taken on the line 4—4 in Figure 3.

Similar parts are designated by the same reference characters in the different figures.

The improved tongs, as shown in the present instance, comprise two pairs of crossed jaw levers 1 and 2, the levers of each pair being pivotally connected near their upper ends by a pivot pin 3, and the levers 1 of each pair being rigidly connected by a cross-bar 4 and the levers 2 of each pair being rigidly connected by a cross-bar 5, so that the pairs of levers at the sides of the tongs will swing in unison about their pivot pins 3.

The upper ends of the levers 1 and 2 above their pivotal points are pivotally connected by pins 6 and 7 to links 8 and 9, and the upper ends of these links are pivotally connected by a bar or rod 10 which serves as a carrying handle for the tongs. This handle may be composed of wood or other suitable material, preferably reinforced by a metal bolt 11 extending axially therethrough. An auxiliary handle 12 is provided for holding the tongs open, and for controlling the closing thereof. This handle, which is located in the space between the pairs of jaw levers, is rigidly connected to the cross bar 4 connecting the jaw levers 1, as by a substantially rigid yoke 13 of stiff metal, the ends of which are anchored firmly in the cross bar. The yoke is so shaped and secured to the cross bar that it will swing the handle 12 into a position closely adjacent to and at one side of the carrying handle 10 when the tongs swing into open position, as shown in Fig. 1, when both handles may be grasped by one hand of the person carrying the tongs and held in such adjacency, thus holding the tongs open as when carrying them to the point where the object is to be picked up, and when the auxiliary handle 12 is released from the hand while the tongs are held and supported by the handle 10, the tongs will be permitted to swing by gravity into closed position to grip an object, as shown in Fig. 2.

The jaws of the tongs which receive and grip the object to be carried comprise jaw members 14 and 15 which span the space between and rigidly connect the lower ends of the jaw levers 1 and 2 forming the sides of the tongs. When the tongs are constructed of wood these jaw members are preferably mortised into the inner sides of the lower ends of the jaw levers and secured thereto by screws 16. In order to enable the jaw members to obtain an effective grip upon articles or objects of ovoidal shape, such as watermelons, they are formed on their inner sides with concave surfaces 17 to conform substantially with the ovoidal shape of such an object, and to distribute the gripping pressure evenly over the surface thereof. As these surfaces are concave horizontally as well as vertically, they will also prevent slipping of the object endwise from between the jaw members. The jaw levers are also preferably curved oppositely to conform substantially with the sides of the object, and to locate the jaw members in adjacent relation when the tongs are closed, so that the jaw members will extend beneath and thereby support the object.

In using the improved tongs constructed as hereinbefore described, the tongs are carried to the place where the article is to be picked up by grasping both handles 10 and 12 in one hand and holding them in adjacent relation as shown in Fig. 1, while the tongs are being carried. These handles may be quickly brought into such adjacent relation by resting the tongs on the ground, the weight of the toggle links 8 and 9 then acting to open the tongs. In order to grip the article to be carried, it is only necessary to release the grip of the hand upon the auxiliary handle 12 while the handle 10 is still held in the hand, and to lift the tongs thereby, the weight of the tongs then straightening the toggle links 8 and 9 and causing the jaws to close upon and grip the object at opposite sides, as shown in Fig. 2. When the tongs and the object are lifted by the handle 10, the lifting force thus applied acts, through the toggle links 8 and 9, to increase the gripping pressure upon the object, it being observed that, the greater the weight of the object being lifted and carried, the greater will be the closing force applied by the toggle links. When the object has been carried to the place where it is to be deposited, the tongs are released therefrom by placing the object and the tongs on the ground or other support, the grip of the tongs on the object being thereby released, and the tongs opened automatically by dropping the toggle links 8 and 9, and as the tongs open, the auxiliary handle 12 is returned to a position adjacent to the carrying handle, as shown in Fig. 1, where it may be grasped by the hand and held against the handle 10 while the tongs are being carried to a place to receive another object, the handle 12, while in such position, holding the tongs open or in object receiving condition.

Although the tongs constructed in accordance with the present invention may be used for carrying articles or objects of various kinds and shapes, they are especially adapted for the carrying of objects of ovoidal shapes, as in the harvesting, loading and unloading and other handling of watermelons which are difficult to pick up or carry in the hands. The improved tongs not only enable such objects to be picked up, carried and deposited with ease and facility, but one person is able to carry two watermelons, one in each hand, with the aid of the improved tongs.

I claim:

1. Tongs comprising two laterally spaced pairs of jaw levers pivotally connected intermediately of their upper and lower ends, cross-members rigidly connecting the levers of said pairs at points below their pivotal connections for pivotal movements in unison, means connecting the upper ends of the levers of each pair for opening and closing the tongs, a carrying handle extending between and connecting the connecting means for the pairs of levers, and means rigidly connected to one of the cross-members and extending from said cross-member in a direction and for a distance sufficient to be swung, by the opening and closing of the tongs, upwardly and downwardly respectively and laterally to and from a position at a side of and in hand gripping relation with the carrying handle.

2. Tongs comprising laterally spaced pairs of levers pivotally connected intermediately of their upper and lower ends and having jaw members connecting the lower ends of the levers of the pairs, cross members connecting the respective pairs of levers below the pivotal connections of the pairs of levers for pivotal movements in unison in opening and closing the tongs, operating means connecting the upper ends of the levers of each pair, a carrying handle connecting the operating means, a yoke rigidly fixed to and extending transversely from one of the cross members in the space between the pairs of levers and carrying an auxiliary handle which is swung by relative pivotal movements of the levers to and from a position to be grasped and released by the hand gripping the carrying handle.

3. Tongs for carrying objects of ovoidal shape, comprising laterally spaced pairs of levers pivotally connected intermediately of their upper and lower ends, jaw members spanning the space between and rigidly connecting the lower ends of levers of the respective pairs and having concave object-engaging surfaces which conform substantially in planes respectively parallel and transverse to the planes of the levers with the respective curvatures of an ovoidal object about its major and minor axes, the portions of the levers below their pivotal connections being bowed outwardly in the planes of the respective pairs thereof to conform substantially with the respective sides of an ovoidal object between them, and said levers being disposed in planes spaced apart sufficiently to enable the middle portion of an ovoidal object to project outwardly between them while the jaw members are in closed position, means connecting the upper ends of the levers of each pair for opening and closing their lower ends and the jaw members, a carrying handle extending between and connecting said connecting means for the pairs of levers, a yoke disposed in the space between the pairs of levers and rigidly connected to one of the levers of each pair at points below the pivotal connections of said levers to the other levers of the pairs and extending upwardly from said points, and an auxiliary handle on the yoke and between the pairs of levers which is swung by relative pivotal movements of the levers to and from a position at a side of and in hand gripping relation with the carrying handle.

FRÉDÉRIC F. LANG.

REFERENCES CITED

The following references are of record in the file of this patent:

UNITED STATES PATENTS

| Number | Name | Date |
|---|---|---|
| 341,473 | Green | May 11, 1886 |
| 661,033 | Brownfield | Nov. 6, 1900 |
| 837,873 | McDonnell | Dec. 4, 1906 |
| 905,010 | Simmons | Nov. 24, 1908 |
| 1,360,114 | Kay | Nov. 23, 1920 |
| 1,480,820 | Hendrickson | Jan. 15, 1924 |
| 1,488,160 | Kerwin | Mar. 25, 1924 |
| 1,705,652 | Ulsh | Mar. 19, 1929 |